US009353731B2

(12) United States Patent
Olesen

(10) Patent No.: US 9,353,731 B2
(45) Date of Patent: May 31, 2016

(54) WIND TURBINE

(75) Inventor: Henrik Steengaard Olesen, Vejle (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 906 days.

(21) Appl. No.: 13/396,961

(22) Filed: Feb. 15, 2012

(65) Prior Publication Data

US 2012/0221159 A1    Aug. 30, 2012

(30) Foreign Application Priority Data

Feb. 25, 2011  (EP) .................................. 11156049

(51) Int. Cl.
G06F 1/30 (2006.01)
H02J 3/38 (2006.01)
F03D 9/00 (2016.01)
F03D 7/02 (2006.01)
F03D 9/02 (2006.01)

(52) U.S. Cl.
CPC .............. *F03D 9/001* (2013.01); *F03D 7/0284* (2013.01); *F03D 9/005* (2013.01); *F03D 9/021* (2013.01); *F05B 2240/40* (2013.01); *Y02E 10/723* (2013.01); *Y10T 307/707* (2015.04)

(58) Field of Classification Search
CPC ......... F03D 7/04; F03D 7/048; F03D 7/0428; F03D 9/001; F03D 9/005; F03D 9/021; Y02E 10/72; Y02E 10/723; Y02E 10/725; Y02E 10/766; F05B 2240/40
USPC ............................... 700/287, 292; 290/44, 55
See application file for complete search history.

(56) References Cited

U.S. PATENT DOCUMENTS

| | | | | |
|---|---|---|---|---|
| 7,256,508 | B2* | 8/2007 | Altemark et al. | 290/44 |
| 7,474,016 | B2* | 1/2009 | Wang et al. | 307/45 |
| 7,531,915 | B2* | 5/2009 | Wang et al. | 307/57 |
| 7,557,464 | B2* | 7/2009 | Wang et al. | 307/65 |
| 7,656,054 | B2* | 2/2010 | Lardellier | 290/52 |
| 7,928,592 | B2* | 4/2011 | Wagoner et al. | 290/44 |
| 7,939,959 | B2* | 5/2011 | Wagoner et al. | 290/55 |

(Continued)

FOREIGN PATENT DOCUMENTS

| | | |
|---|---|---|
| CN | 101672252 A | 3/2010 |
| EP | 1768223 A2 | 3/2007 |
| WO | WO 03008802 A1 | 1/2003 |

OTHER PUBLICATIONS

"What is Power Rating?", wiseGEEK, http://www.wisegeek.com/what-is-a-power-rating.htm, Oct. 9, 2015.*

(Continued)

*Primary Examiner* — Charles Kasenge

(57) ABSTRACT

A wind turbine is provided. The wind turbine includes a generator generating an amount of electric power, and at least two electrical converter units, with each electrical converter unit being electrically connectable to the generator and to a utility grid. Each electrical converter unit is adapted to convert electric power up to a defined admissible maximum capacity. The amount of electric power generated by the generator is equally distributed to all respective electrical converter units. If at least one electrical converter unit fails, the amount of electric power generated by the generator is distributed to the remaining electrical converter units in operation, wherein each of the remaining electrical converter units converts a respective amount of electric power up to its respective admissible maximum capacity.

12 Claims, 2 Drawing Sheets

(56) References Cited

U.S. PATENT DOCUMENTS

| | | | |
|---|---|---|---|
| 7,944,068 B2* | 5/2011 | Wagoner et al. | 290/44 |
| 8,138,620 B2* | 3/2012 | Wagoner et al. | 290/44 |
| 8,188,610 B2* | 5/2012 | Scholte-Wassink | 290/44 |
| 2004/0119292 A1* | 6/2004 | Datta et al. | 290/44 |
| 2006/0214428 A1* | 9/2006 | Altemark et al. | 290/44 |
| 2008/0284252 A1* | 11/2008 | Jones | H02J 3/01 307/82 |
| 2009/0001725 A1* | 1/2009 | Llorente Gonzalez et al. | 290/44 |
| 2009/0224607 A1* | 9/2009 | Kjaer et al. | 307/82 |
| 2009/0322081 A1* | 12/2009 | Wagoner et al. | 290/44 |
| 2009/0322082 A1* | 12/2009 | Wagoner et al. | 290/44 |
| 2009/0322083 A1* | 12/2009 | Wagoner et al. | 290/44 |
| 2010/0060000 A1* | 3/2010 | Scholte-Wassink | 290/44 |
| 2010/0314872 A1* | 12/2010 | Wagoner et al. | 290/44 |
| 2011/0025059 A1* | 2/2011 | Helle et al. | 290/44 |
| 2011/0049994 A1* | 3/2011 | Hiller et al. | 307/82 |
| 2011/0057446 A1* | 3/2011 | Mayor Lusarreta et al. | 290/44 |
| 2011/0133461 A1* | 6/2011 | Hjort | 290/44 |

OTHER PUBLICATIONS

"Power rating", Wikipedia, https://en.wikipedia.org/wiki/Power_rating, Oct. 9, 2015.*

* cited by examiner

WIND TURBINE

CROSS REFERENCE TO RELATED APPLICATIONS

This application claims priority of European Patent Office application No. 11156049.6 EP filed Feb. 25, 2011. All of the applications are incorporated by reference herein in their entirety.

FIELD OF INVENTION

The invention relates to a wind turbine, comprising at least one generator generating an amount of electric power, and at least two electrical converter units, with each electrical converter unit being related to the generator and to a utility grid, and each electrical converter unit being adapted to convert electrical power up to a defined admissible maximum capacity.

BACKGROUND OF INVENTION

Since the amount of wind energy, i.e. the aerodynamic conditions may vary, indirect grid connections are known, whereby the wind turbine generator runs in its own, separate alternating current (AC) grid. This grid is usually controlled by an inverter, so that the frequency of the alternating current in the stator of the generator may be adapted to the current rotational speed of the rotor hub of the wind turbine, i.e. the wind turbine will generate alternate current at exactly the variable frequency applied to the stator.

Since alternating current with a variable frequency cannot be applied to the utility grid, it needs to be rectified or converted into direct current (DC). The conversion from variable frequency AC to DC can be executed by thyristors or transistors for instance. Further, the direct current is reconverted to an alternating current having a frequency applicable to the utility grid. Again, either thyristors or transistors may be used to convert the direct current into alternating current. Thereby, the gained alternating current usually needs to be smoothed before it is supplied to the utility grid. Therefore, AC filter mechanisms using appropriate inductances and capacitors may be used for instance.

In order to improve the power quality of the power applied to the grid, modern wind turbines comprising a generator and a number of electrical converter units have been proposed since, by using a plurality of converter units a better control of reactive power is feasible.

Yet, it is a drawback of prior art using indirect grid connections, that availability rates of the wind turbines are often lower in comparison to wind turbines having a direct grid connection due to failures in the power electronics, that is mainly the electrical converter units.

SUMMARY OF INVENTION

Thus, it is the object of the present invention to provide an improved wind turbine, particularly regarding its availability rate.

This is achieved by a wind turbine as described before, wherein the amount of electric power generated by the generator is equally distributed to all respective electrical converter units, whereby if at least one electrical converter unit fails, the amount of electric power generated by the generator is distributed to the remaining electrical converter units in operation, whereby each of the remaining electrical converter units converts a respective amount of electrical power up to its respective admissible maximum capacity.

According to the present invention, the current electrical power output of the at least one generator is distributed to the respective number of electrical converter units in equal manner, so that generally all electrical converter units are always operated during operation of the wind turbine. That is, in case of two electrical converter units, each electrical converter unit converts half of the current electric power generated by the generator, in case of three electrical converter units, each electrical converter unit converts a third of the current electric power generated by the generator, etc. The absolute electric power converted by the respective electrical converter units is limited by their respective admissible maximum conversion capacities. That is, each electrical converter unit is adapted to only convert a certain or defined amount of electrical power supplied from the generator. The respective admissible maximum capacity of an electrical converter unit may consider a certain or defined maximum conversion capacity ensuring that damages of the respective electrical converter units due to an overload are avoided along with respective buffers areas or the like. Preferably, all electrical converter units have the same admissible maximum capacity.

In case of a failure of at least one electrical converter unit the present wind turbine, that is preferably a respective central control unit such as a wind turbine controller or the like redistributes the electrical power currently generated by the generator to the remainder of the still operating electrical converter units, so that the operation of the wind turbine is still guaranteed. Hence, all operable electrical converter units of the inventive wind turbine are always in operation, whereby faulty electrical converter units may be detected and excluded from the conversion of power supplied by the generator, that is the wind turbine or a respective wind turbine control unit is adapted to isolate faulty electrical converter units from operating electrical converter units, so that the wind turbine is ready to operate until the last electrical converter unit fails.

This will be explained on the basis of the following example of a wind turbine having a generator with a maximum output of 1 MW and four electrical converter units each having a maximum conversion capacity of 250 kW. Under given aerodynamic conditions, the generator will output an amount of 500 kW, that is half of its maximum output, so that each of the electrical converter units will convert a fourth of the electric power output of the generator, that is 125 kW, so that each of the electrical converter units reach 50% of their respective maximum conversion capacity. In case of a failure of one of the electrical converter units, the 500 kW output of the generator is distributed to the remaining three electrical converter units, that is each electrical converter unit is supplied with ca. 166 kW, that is each of the remaining electrical converter units reaches ca. 66% of the respective maximum conversion capacity.

In principle, if the wind turbine comprises more than two electrical converter units and at least one of the respective electrical converter unit fails, the electric power generated by the generator is equally distributed to the remaining, still operable electrical converter units.

Generally, the following scenarios are thinkable.

In a first embodiment, the current or current possible output of electric power of the generator(s) is below or equal to the respective maximum admissible conversion capacity or capacities of the respective remaining electrical converter units, i.e. the generator(s) generate(s) the respective amount of electric power which the respective remaining electrical converter units may convert at most, or less electric power than the respective remaining electrical converter units may convert. Thereby, the output of electric power of the generator(s) is equally distributed to the respective remaining electrical converter unit in the above described manner. The respective maximum admissible conversion capacity of the respective remaining electrical converter units is just or not reached.

In a second embodiment, the current or current possible output of electric power of the generator(s) exceeds the sum of the respective maximum admissible conversion capacities of the respective remaining electrical converter units, i.e. the generator(s) generate(s) more electric power than the respective remaining electrical converter units may convert. Again, the output of electric power of the generator(s) is equally distributed to the respective remaining electrical converter units in the above described manner. In this case the respective maximum admissible conversion capacity of the respective remaining electrical converter units is reached, i.e. the respective remaining electrical converter units work under full load.

In a third embodiment, the current or current possible output of electric power of the generator(s) also exceeds the sum of the respective maximum admissible conversion capacities of the respective remaining electrical converter units, i.e. the generator(s) generate(s) more electric power than the respective remaining electrical converter units may convert. Again, the output of electric power of the generator(s) is equally distributed to the respective remaining electrical converter units in the above described manner. The respective remaining electrical converter units work under full load. Yet, in this embodiment it is possible that the power output of the generator(s) may be adapted to the maximum possible amount of electric power convertable by the respective remaining electrical converter units in sum, that is the power output of the generator may be reduced in consideration of the maximum possible amount of electric power convertable by the respective remaining electrical converter units in sum.

It is understood that the three embodiments are also applicable to the case of merely one operable electrical converter unit left. Hence, according to the first embodiment, the output of the generator would be below the maximum admissible conversion capacity of the respective electrical converter unit, so that the electrical converter unit works not fully loaded. According to the second embodiment, the output of the generator would exceed the maximum admissible conversion capacity of the respective electrical converter unit, i.e. the respective electrical converter unit works under full load. According to the third embodiment, the output of the generator would also exceed the maximum admissible conversion capacity of the respective electrical converter unit, i.e. the respective electrical converter unit works under full load. Yet, the power output of the generator would be adapted to the respective the maximum admissible conversion capacity of the respective electrical converter unit, that is the output of the generator(s) corresponds to the maximum admissible conversion capacity of the respective electrical converter unit.

The wind turbine is adapted in such a manner that in case of the generator operating under full load, the respective electrical converter units also work under full load, i.e., the sum of the maximum admissible conversion capacities of all electrical converter units corresponds to the maximum power output of the respective generator(s).

Hence, the present wind turbine is adapted to execute a novel operating method as will be described later.

According to a preferred embodiment of the invention, the admissible maximum capacity of electric power to be converted of each respective electrical converter unit is below the maximum output of electric power generated by the generator. Hence, the respective number of electrical converter units is adjusted to the maximum power output of the at least one generator. Hence, as has been described before, the total maximum conversion capacity of the respective electrical converter unit (each having a respective admissible maximum capacity) in sum corresponds to the maximum power output of the at least one generator. Thus, if the generator works under full load, the respective electrical converter units also work under full load.

This will be further explained by means of the following example of a wind turbine having a generator with a maximum output of 1 MW and two electrical converter units each having a maximum conversion capacity of 500 kW. When the generator works under full load it generates 1 MW of electric power. Accordingly, each electrical converter units converts 500 kW of the electric power supply from the generator. Hence, both electrical converter units have reached their respective admissible maximum capacity in this case. If the generator merely generates 500 kW of electric power due to different aerodynamic conditions for instance, each electrical converter unit converts 250 kW of the electric power supplied by the generator. In both cases, the entire amount of electric power generated by the generator is converted in respective electric power applicable to the utility grid.

It is preferred that the respective electrical converter units are adapted to communicate with each other. Further, it is preferred that each electrical converter unit is adapted to communicate with a wind park control unit. Hence, the respective electrical converter units are ready to communicate with each other and/or respective external control units such a wind park controllers or the like representing a part of a superior control device such as a SCADA system (supervisory control and data acquisition system) of a wind park comprising a number of wind turbines for instance.

In a further embodiment of the invention, the wind turbine may comprise a central control unit adapted to communicate with each of the electrical converter units, whereby information regarding the operation of the electrical converter units is sent to all electrical converter units, whereby only one of the respective electrical converter units is adapted to process the information regarding the operation of the electrical converter unit. Hence, the respective electrical converter units are configured in a hierarchic structure, whereupon one of the electrical converter units is deemed as a master, whereas the remaining electrical converter units are deemed as slaves. Although, the central control unit, that is a wind turbine controller or the like sends information regarding the operation of the electrical converter units to all electrical converter units for redundancy, merely the master is able to process the information, that is merely the master is able to act on it. It is understood that at least the respective electrical converter unit deemed as the master comprises at least one control unit itself. In an exemplary case, merely the master is capable of receiving a power set point from the central control unit and/or a wind park controller. Hence, merely the master may calculate the necessary active and reactive current vectors for instance.

Thereby, it is practical that the respective electrical converter unit processing the information regarding the operation of the electrical converter units is adapted to control the remaining electrical converter units in consideration of the respective information. Hence, in dependence of the information regarding the operation of the electrical converter units the respective electrical converter unit deemed as the master sends respective control signals to the remaining electrical converter units deemed as slaves. That is, the control unit of the electrical converter unit deemed as the master sends respective control signals to respective control units of the electrical converter units deemed as slaves for instance.

Each electrical converter unit may comprise at least one electrical breaker, at least one generator side rectifier, at least one utility grid side rectifier, at least one generator side inverter, at least one utility grid side inverter, at least one DC-link, and at least one control unit. Hence, the respective electrical converter units are provided with the essential electrical components required for an indirect grid connection, i.e. the respective electrical converter units are ready to convert AC with variable frequencies supplied from the generator during its operation to AC with fixed frequency applicable utility grid. In the same manner, the respective electrical converter units are ready to communicate with each other and/or external components such as a wind park controller for instance by the respective control units or respective communication units.

The electrical converter units are favourably connected in parallel. Yet, in exceptional cases a serial connection of the respective electrical converter units is thinkable as well, whereby electrical bridgings may be necessary in order to bridge faulty electrical converter units if need be.

Aside, the present invention relates to a method for operating a wind turbine, particularly the wind turbine as described before. The wind turbine comprises at least one generator generating an amount of electric power, and at least two electrical converter units with each electrical converter unit being related to the generator and to a utility grid, and each electrical converter unit being adapted to convert electrical power up to a defined admissible maximum capacity. The method is characterised in the steps of equally distributing the amount of electric power generated by the generator to all electrical converter units, and if at least one electrical converter unit fails, distributing the amount of electric power generated by the generator to the remaining electrical converter units in operation, whereby each of the remaining electrical converter units converts a respective amount of electrical power up to its respective admissible maximum capacity.

Thus, the inventive method allows that operation of the wind turbine is still assured even if at least one of the electrical converter units of the wind turbine fails, since the electric power generated by the generator is equally distributed to the remaining electrical converter units which are still operable.

Thereby, the used electrical converter units may have an admissible maximum capacity of electrical power to be converted below the maximum output of electrical power generated by the generator. In such a manner, the wind turbine still produces electric power in the case of a failure of at least one electrical converter unit, though with a reduced power output. Of course, the sum of the respective admissible maximum capacities of the respective electrical converter units corresponds to the maximum power output of the generator(s), so that the amount of electric power generated by the generator(s) under full load may be converted in respective electric power applicable to the utility grid.

In favour, the respective electrical converter units communicate with each other. Aside, each electrical converter unit practically communicates with a wind park control unit. That is, the wind turbine allows an internal communication of the respective electrical converter units and/or an external communication of the respective electric converter units with a physically external device such as a wind park control unit for instance.

It is possible that a central control unit communicates with each of the electrical converter units, whereby information regarding the operation of the electrical converter units is sent to all electrical converter units, whereby the information regarding the operation of the electrical converter units is processed by only one of the respective electrical converter units. Thus, the respective electrical converter units are configured in a hierarchic structure, whereby one electrical converter unit may be deemed as a master, whereas the remaining electrical converter units are deemed as slaves. Thereby, only the master is able to process the respective information regarding the operation of the electrical converter units, which is nevertheless sent to all respective electrical converter units for redundancy.

In a further embodiment it is preferred that the respective electrical converter unit processing the information regarding the operation of the electrical converter units controls the operation of the remaining electrical converter units in consideration of the respective information. Thus, the respective electrical converter unit deemed as the master serves as the controller of the remaining electrical converter units, i.e. it distributes information regarding the operation of the electrical converter units deemed as slaves in terms of control signals, whereupon the remaining electrical converter units may react.

BRIEF DESCRIPTION OF THE DRAWINGS

In the following, the invention is described in detail as reference is made to the figures, whereby.

DETAILED DESCRIPTION OF INVENTION

Figure 1:
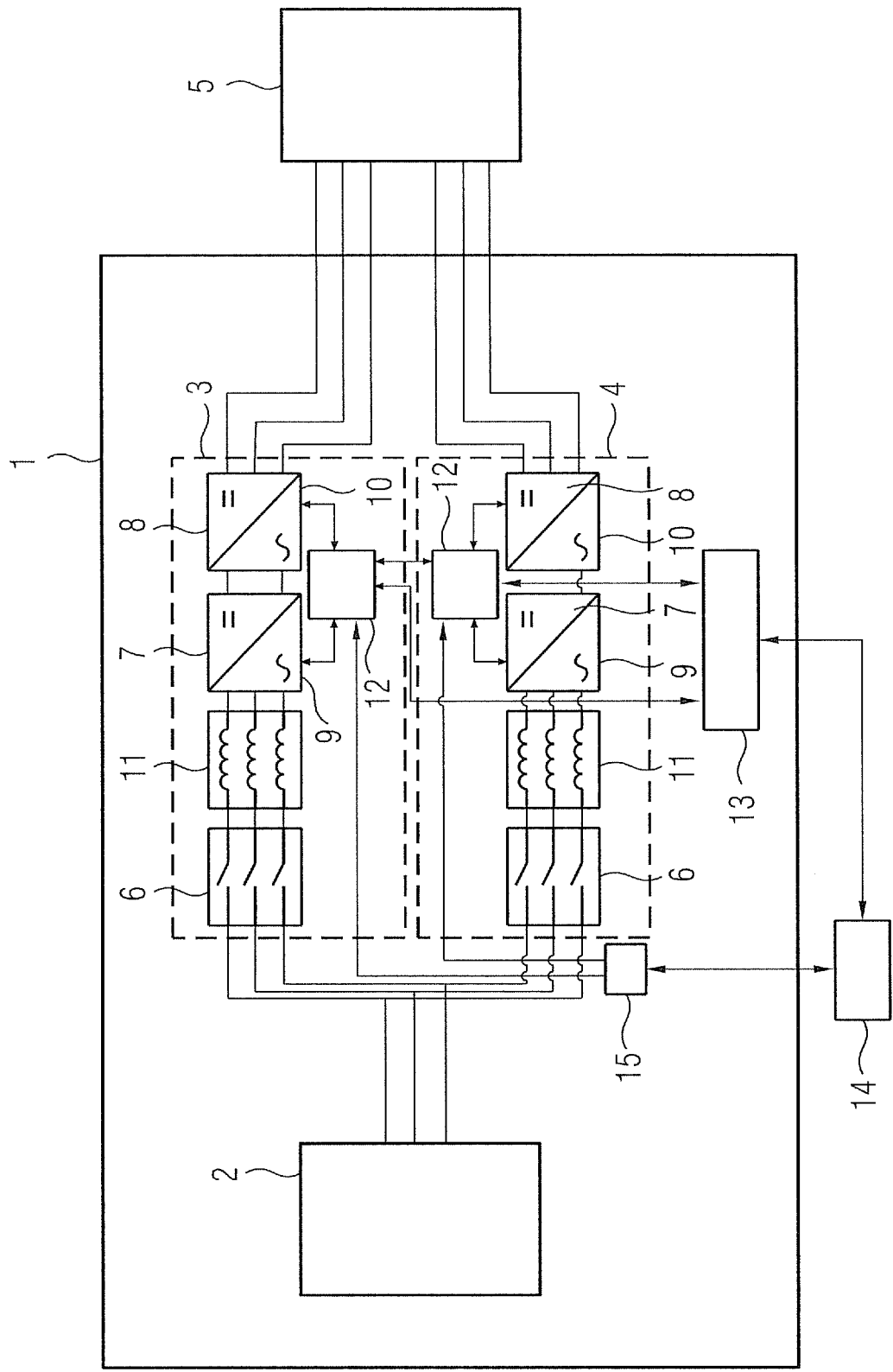
FIG. 1 shows a principle cut-out view of a wind turbine according to an exemplary embodiment of the present invention.

FIG. 1 shows a principle cut-out view of a wind turbine 1 as denoted by the rectangle, whereby only components of the wind turbine 1 having being relevant in terms of the present invention are depicted. The wind turbine 1 comprises a generator 2 adapted to generate electric power during operation of the wind turbine 1. The generator 2 is mechanically connected to a rotor hub (not shown) of the wind turbine 1 in known manner.

The wind turbine 1 comprises a number of, i.e. two electrical converter units 3, 4 adapted to convert electric power generated by the generator 2 into electric power applicable to the utility grid 5. The electrical converter units 3, 4 have a parallel configuration, that is are connected in parallel. Each electrical converter unit 3, 4 is related, that is electrically connected to the generator 2 and to the utility grid 5. Since the generator 2 is preferably built as a three-phase generator, the generator 2 is connected to each electrical converter unit 3, 4 by three respective output lines.

The wind turbine 1 is provided with an indirect grid connection, that is the electrical converter units 3, 4 comprise respective components allowing a conversion of AC with variable frequency supplied from the generator 2 to AC with fixed frequency applicable to the utility grid 5. Accordingly, each electrical converter unit 3, 4 comprises an electrical breaker 6, a generator side rectifier 7, a utility grid side rectifier 8, a generator side inverter 9, a utility grid side inverter 10, a DC-link 11, and a control unit 12.

The respective control units 12 communicate with the respective rectifiers 7, 8, the respective converters 9, 10 and a central control unit 13 (wind turbine controller) of the wind turbine 1. The central control unit 13 is adapted to communicate with a park control unit 14 being used for regulation of a wind park comprising a number of respective wind turbines 1, that is the park control unit 14 allows to control active and reactive power of individual wind turbines, such as the present wind turbine 1 as well as clusters of wind turbines within a wind park. The park control unit 14 also communicates with the respective control units 12 of the electrical converter units 3, 4 by means of a standard network switch 15 such as an Ethernet switch. Further, the respective control units 12 of the electrical converter units 3, 4 are ready to communicate with each other.

Figure 2:
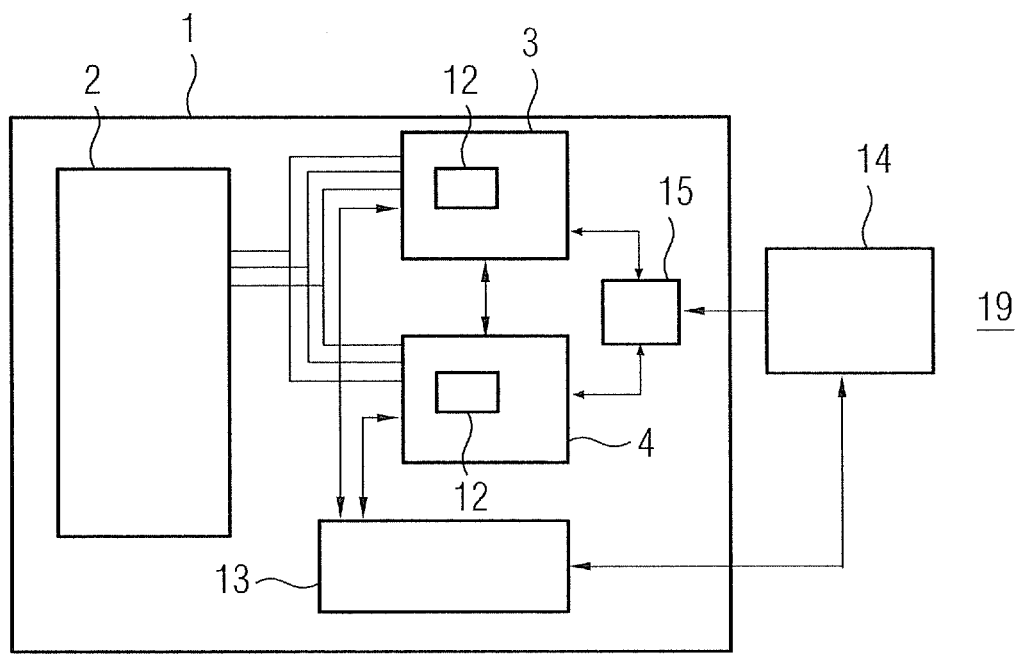
FIG. 2 shows a principle cut-out view of a wind turbine according to an exemplary embodiment of the present invention.

As is also discernible from FIG. 2, the physical interface between both electrical converter units 3, 4 and the central control unit 13 as well as the park control unit 14 is duplicate, that is both electrical converter units 3, 4 have a separate connection or interface to the central control unit 13 as well as the wind park control unit 14 being part of an external control system 19 such as a SCADA system for instance.

The operation of the wind turbine 1 will be described in the following.

During normal operation of the wind turbine 1 the electric power generated by the generator 2 is equally distributed to all electrical converter units 3, 4, that is each electrical converter unit 3, 4 converts half of the electric power output from the generator 2 within the limits of their respective admissible maximum capacity. Thereby, it is assured that the total amount of electrical power convertable by the electrical converter units 3, 4 corresponds to the maximum power output of the generator 2. As an example, the generator 2 may have a maximum power output of 1 MW hence, both electrical converter units 3, 4 are able to convert an amount of electric power up to 500 kW. That is, the electrical converter units 3, 4 have an admissible maximum capacity of electrical power to be converted below the maximum output of electrical power generators by the generator 2.

Figure 3:
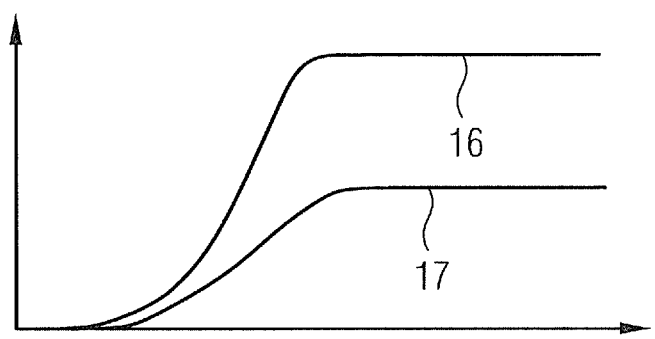
FIG. 3 shows a diagram indicating the power output of the wind turbine during normal operation.

This is depicted in FIG. 3 showing a diagram indicating the power output (y-axis) of the wind turbine 1 during normal operation in dependence of the wind speed (x-axis). Thereby, line 16 represents the power output of the entire wind turbine 1, whereas line 17 represents the power output of one of the electrical converter units 3, 4, which is half of the power output of the wind turbine 1 at all times.

During normal operation of the wind turbine 1, the central control unit 13 communicates with each of the electrical converter units 3, 4, whereby information regarding the operation of the electrical converter units 3, 4 is sent to both electrical converter units 3, 4 for redundancy. Yet, information regarding the operation of the electrical converter units 3, 4 is only processed by electrical converter unit 3 since the electrical converter units 3, 4 are configured in a hierarchic structure with the electrical converter unit 3 being deemed as a master, whereas electrical converter unit 4 being deemed as a slave. Thus, only electrical converter unit 3 may receive and process power control signals such as power set points from the central control unit 13 and/or the park controller 14 for instance. That is, though both electrical converter units 3, 4 are adapted to receive respective control signals only the electrical converter unit 3, i.e. the master is able to act on it, that is will calculate the necessary active and reactive current vectors for instance.

The respective electrical converter unit 3 processing the information regarding the operation of the electrical converter units 3, 4 further controls the operation of the electrical converter unit 4 in consideration of the respective information. That is, the electrical converter unit 3 (master) will distribute or share power set points or the like with the electrical converter unit 4 (slave), so that the electrical converter unit 4 may react on it.

If a failure in one of the electrical converter units 3, 4 that is the electrical converter unit 4 for instance, occurs, the central control unit 13 will detect the failure and isolate the respective faulty electrical convert unit 4. In this case, the wind turbine 1 is still operable. Yet, the power output of the wind turbine 1 will be reduced, that is the output is only half of the original value in the case of the generator 2 working under full load.

Figure 4:
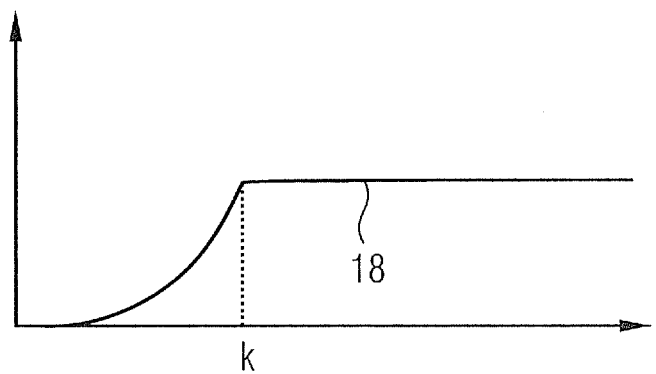
FIG. 4 shows a diagram indicating the power output of the wind turbine during operation with one faulty electrical converter unit.

This is depicted in FIG. 4 showing a diagram indicating the power output (y-axis) of the wind turbine 1 with only one operable electrical converter unit (electrical converter unit 3) in dependence of the wind speed (x-axis) during operation of the wind turbine 1. The wind turbine 1 is still able to supply electrical power to the utility grid 5, yet the maximum power output of the wind turbine 1 is reduced, that is the maximum output is half of the original value above wind speeds greater than the critical value indicated as k. For wind speeds lower than k the control unit 12 is ready to adapt the power curve (cf. line 18) of the electrical converter unit 3 to follow the power curve of the wind turbine 1 working with two operable electrical converter units 3, 4 (cf. FIG. 3, line 16). In such a manner, the amount of electric power output by the wind turbine 1 may be optimised even in the case of the faulty electrical converter unit 4.

If the electrical converter unit 3, that is the master encounters failure, the central control unit 13 is able to reconfigure the hierarchic structure of the electrical converter units 3, 4, that is, the electrical converter unit 4, originally deemed as the slave will change its state to become the master.

The present invention provides a novel wind turbine and a novel method for operating a wind turbine respectively, allowing an operation of the wind turbine 1 even in case of a failure of one of the respective electrical converter units 3, 4. This is mainly based on the fact, that the electrical converter systems 3, 4 are redundant, that is a failure in one electrical converter unit 3, 4 does not negatively affect the remaining electrical converter unit 3, 4 and the operation of the wind turbine 1 as a whole.

The invention claimed is:

1. A wind turbine, comprising:
  a generator generating an amount of electric power,
  at least two electrical converter units, each electrical converter unit being electrically connectable to the generator and to a utility grid and each electrical converter unit being adapted to convert electric power up to a defined admissible maximum capacity, and
  a central control unit adapted to communicate with each of the electrical converter units,
  wherein the amount of electric power generated by the generator is equally distributed to all respective electrical converter units,
  wherein if at least one electrical converter unit fails, the amount of electric power generated by the generator is distributed to the remaining electrical converter units in operation, wherein each of the remaining electrical converter units converts a respective amount of electric power up to each of the remaining electrical converter units respective admissible maximum capacity, wherein information regarding the operation of the electrical converter units is sent to all electrical converter units, and wherein only one of the respective electrical converter units is adapted to process the information regarding the operation of the electrical converter units.

2. A wind turbine according to claim 1, wherein the admissible maximum capacity of electric power to be converted of each respective electrical converter unit is below the maximum output of electric power generated by the generator.

3. A wind turbine according to claim 1, wherein the respective electrical converter units are adapted to communicate with each other.

4. A wind turbine according to claim 1, wherein the respective electrical converter unit processing the information regarding the operation of the electrical converter units is adapted to control the remaining electrical converter units in consideration of the respective information.

5. A wind turbine according to claim 1, wherein each electrical converter unit is adapted to communicate with a wind park control unit.

6. A wind turbine according to claim 1, wherein each electrical converter unit comprises:
- at least one electrical breaker,
- at least one generator side rectifier,
- at least one utility grid side rectifier,
- at least one generator side inverter,
- at least one utility grid side inverter,
- at least one DC-link, and
- at least one control unit.

7. A wind turbine according to claim 1, wherein the electrical converter units are connected in parallel.

8. A method for operating a wind turbine, the wind turbine comprising a generator generating an amount of electric power, and at least two electrical converter units with each electrical converter unit being electrically connected to the generator and to a utility grid, and each electrical converter unit being adapted to convert electrical power up to a defined admissible maximum capacity, the method comprising:

equally distributing the amount of electric power generated by the generator to all electrical converter units, and if at least one electrical converter unit fails, distributing the amount of electric power generated by the generator to the remaining electrical converter units in operation, wherein each of the remaining electrical converter units converts a respective amount of electrical power up to each of the remaining electrical converter units respective admissible maximum capacity, wherein a central control unit communicates with each of the electrical converter units, wherein information regarding the operation of the electrical converter units is sent to all electrical converter units, and wherein the information regarding the operation of the electrical converter units is processed by only one of the respective electrical converter units.

9. The method according to claim 8, wherein the used electrical converter units have an admissible maximum capacity of electrical power to be converted below the maximum output of electrical power generated by the generator.

10. The method according to claim 8, wherein the respective electrical converter units communicate with each other.

11. The method according to claim 8, wherein the respective electrical converter unit processing the information regarding the operation of the electrical converter units controls the operation of the remaining electrical converter units in consideration of the respective information.

12. The method according to claim 8, wherein each electrical converter units communicates with a wind park control unit.

* * * * *